United States Patent [19]

Hoffman, Jr.

[11] Patent Number: 5,638,633
[45] Date of Patent: Jun. 17, 1997

[54] DEVICE FOR EASY ATTACHMENT OF LINE, LEADER, OR TIPPET TO FISH HOOK

[76] Inventor: Henry R. Hoffman, Jr., 17222 Club Hill Dr., Dallas, Tex. 75248

[21] Appl. No.: 635,397

[22] Filed: Apr. 26, 1996

Related U.S. Application Data

[63] Continuation of Ser. No. 293,433, Aug. 22, 1994, abandoned.

[51] Int. Cl.⁶ ........................................ A01K 91/04
[52] U.S. Cl. .................... 43/44.83; 43/43.16; 403/360
[58] Field of Search ..................... 43/44.83, 44.82, 43/43.16, 44.9, 44.91, 42.25, 42.49, 42.08, 42.23, 42.36; 24/618, 619, 573.1, 908; 403/360

[56] References Cited

U.S. PATENT DOCUMENTS

| | | | |
|---|---|---|---|
| 86,154 | 1/1869 | Hiltz | 43/44.83 |
| 319,655 | 6/1885 | Wright | 43/44.83 |
| 1,333,101 | 3/1920 | Cooper | 43/44.83 |
| 3,066,372 | 12/1962 | Parker | 43/44.83 |
| 3,440,663 | 4/1969 | Beguin | 24/619 |
| 3,878,637 | 4/1975 | Flower | |
| 3,898,760 | 8/1975 | Klein | |
| 4,092,796 | 6/1978 | Adams | |
| 4,914,792 | 4/1990 | Bradt | |
| 5,081,785 | 1/1992 | Kahng | 43/42.08 |

FOREIGN PATENT DOCUMENTS

| | | | |
|---|---|---|---|
| 726188 | 5/1932 | France | 43/44.83 |

*Primary Examiner*—Kurt Rowan
*Attorney, Agent, or Firm*—Hovey, Williams, Timmons & Collins

[57] ABSTRACT

An attachment device for attaching a line to a fish hook includes a funnel-shaped portion, a tubular portion which is adapted to extend through an eye of a fish hook, and a retaining portion which is adapted to engage the eye for restraining withdrawal of the tubular portion from the eye. A central opening extends through the funnel portion and the tubular portion, and the funnel facilitates inserting a line through the opening. A knot is tied in the line to prevent the line from being pulled back through the opening.

15 Claims, 2 Drawing Sheets

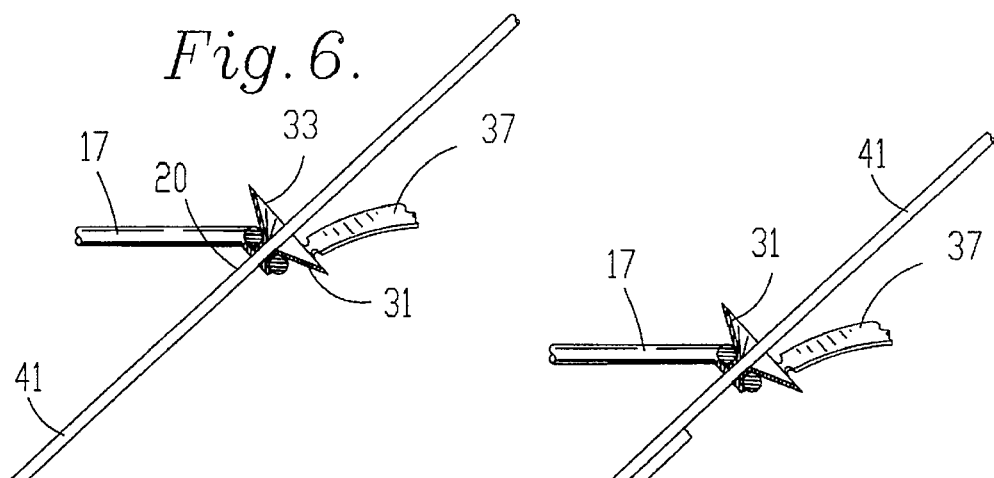
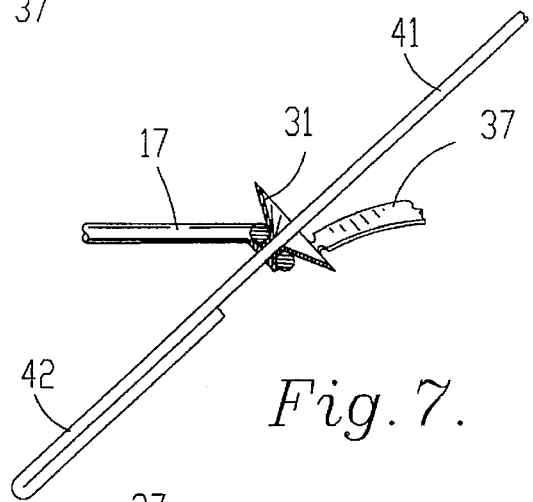
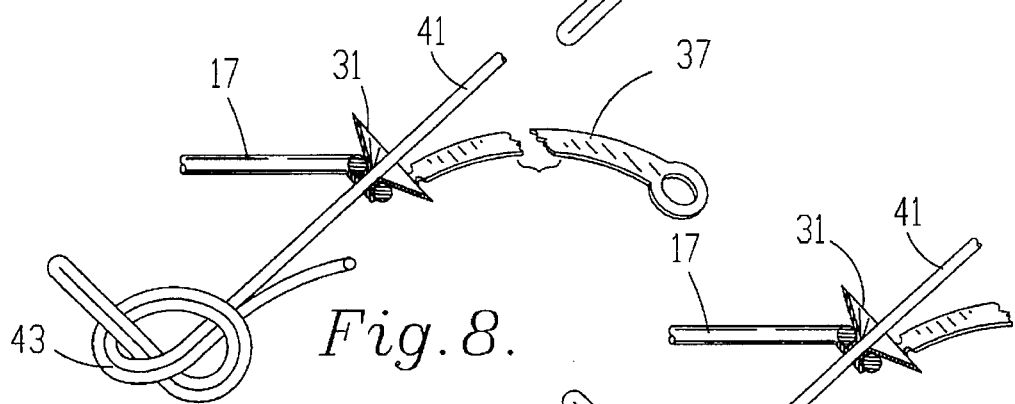
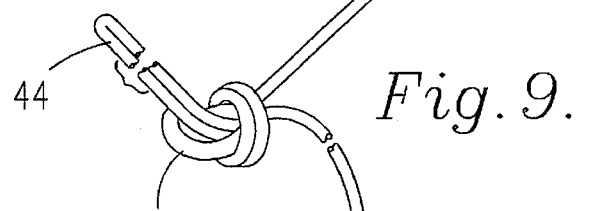
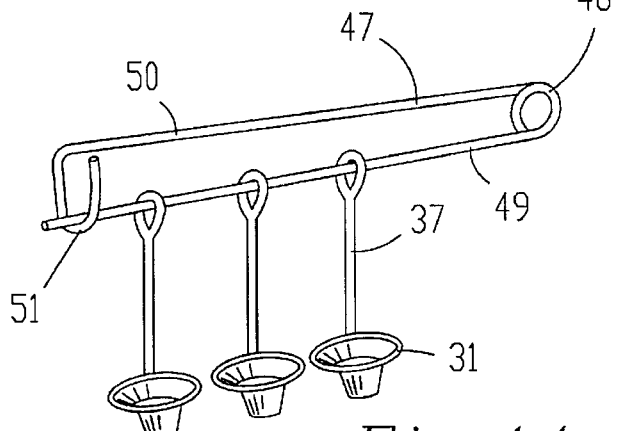
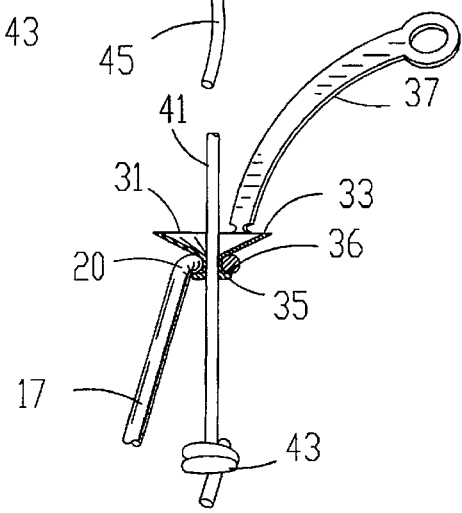

5,638,633

DEVICE FOR EASY ATTACHMENT OF LINE, LEADER, OR TIPPET TO FISH HOOK

This application is a continuation of application Ser. No. 08/293,433, filed Aug. 22, 1994, now abandoned.

BACKGROUND OF THE SUMMARY

This invention relates to fish hooks, and, more particularly, to a device for facilitating attachment of a line, leader, or tippet to a fish hook.

The usual method of attaching a line, leader, tippet, etc. (hereinafter collectively referred to as a line for brevity) to a fish hook, for example, a fly fishing hook, is to push or thread the line through the eye of the hook, tie a cinch knot, and clip off surplus material. Since flys are changed often or are lost, the usual method of attachment can be difficult and/or slow, especially in poor light, with small-eyed hooks. Further, some fishermen lack the manual dexterity which is required for attaching the line.

Previous improvements for attaching a line to a fish hook are generally directed to modifying the design of the hook. However, since millions of hooks are produced annually, it is highly desirable that an improved method of attachment be usable with any hook.

The invention provides an attaching device which can be used with any fish hook. The device includes a tubular portion which is inserted through the eye of a hook, a cone-like flared funnel on one end of the tubular portion, and a retaining portion on the other end of the tubular portion which prevents inadvertent withdrawal of the tubular portion from the hook. The outside end of the funnel portion is substantially wider than the eye of the hook, and a line can be easily inserted through the device simply by feeding the line into the funnel. After the end of the line passes through the device, a knot is tied in the line to prevent the line from being withdrawn through the device. A tab, string, or wire can be attached to the device for ease of storing and handling the device, and the tab can be removed after the device is installed.

DESCRIPTION OF THE DRAWING

The drawing will be explained in conjunction with illustrative embodiments shown in the accompanying drawing, in which.

FIG. 6 is a fragmentary sectional view illustrating a line being inserted through the attaching device;

FIG. 7 is a view similar to FIG. 6 showing the line doubled back in preparation of tying a knot;

FIG. 8 illustrates a knot being tied in the line;

FIG. 9 illustrates the ends of the knot being clipped off;

FIG. 10 is an enlarged view of the attaching device, line, and knot; and

FIG. 11 illustrates a plurality of attaching device stored on a clip by the tabs.

DESCRIPTION OF SPECIFIC EMBODIMENT

Figure 1:
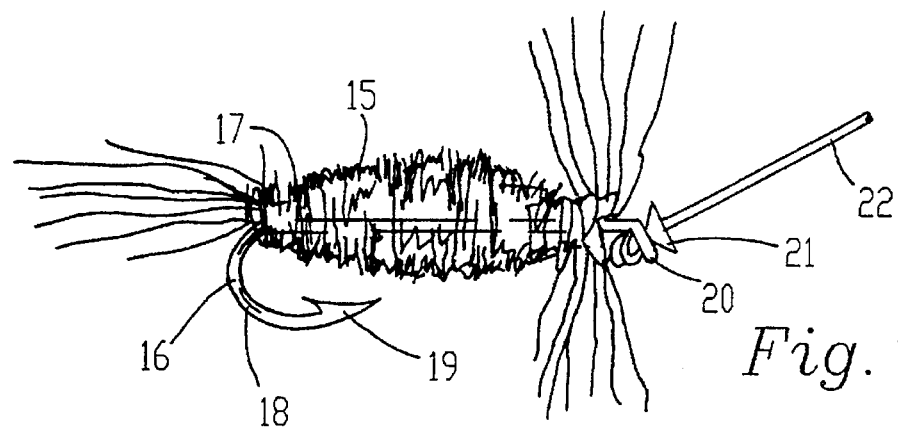
FIG. 1 is an illustration of an attaching device according to the invention installed on a fly.

Referring to FIG. 1, a conventional fly 15 includes a conventional hook 16. The hook includes an elongated shank 17 (FIG. 2), and one end of the shank is reversely curved at 18 and terminates in a barb 19. The other end of the shank is formed into a generally circular eye 20 which has a central opening.

As will be explained hereinafter, an attaching device 21 is inserted into the eye 20 and secures a line 22 to the hook. As used herein, the term "line" is used broadly to refer to a fishing line, leader, tippet, snell, or other device which is commonly attached to a fish hook.

Figure 2:
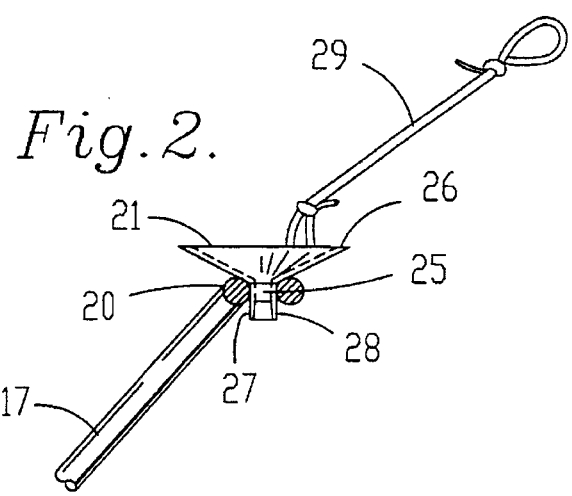
FIG. 2 is a fragmentary sectional view of a metal attaching device inserted through the eye of a fish hook.
Figure 3:
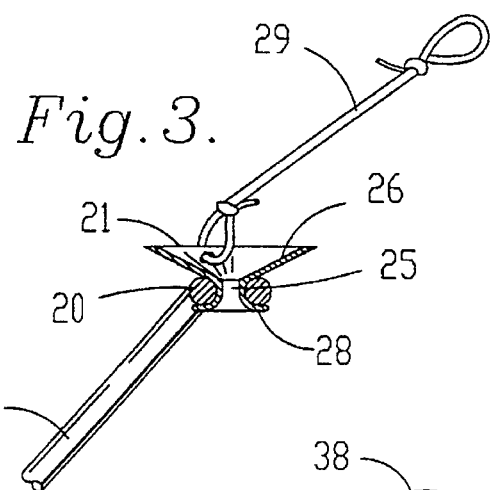
FIG. 3 is a view similar to FIG. 2 showing metal tines deformed around the eye.

Referring to FIGS. 2 and 3, the attaching device 21 includes a tubular central portion 25 which is sized to be inserted through the eye 20 and a funnel portion 26 which diverges outwardly from one end of the tubular portion. A retaining portion 27 extends from the other end of the tubular portion.

In the embodiment illustrated in FIGS. 2 and 3, the retaining portion 27 comprises a plurality of deformable tines or tabs 28 which can be bent or deformed outwardly from the tubular portion as illustrated in FIG. 3. The deformed tines are engageable with the eye 20 to restrain or prevent inadvertent withdrawal of the tubular portion 25 from the eye. The attaching device 21 is advantageously formed from metal or other deformable material.

A tab 29 formed from string, wire, or the like is attached to the funnel portion 26 by an opening in the funnel portion. The tab facilitates storing and handling of the attaching device and can be snipped off after the attaching device is installed on a hook.

Figure 4:
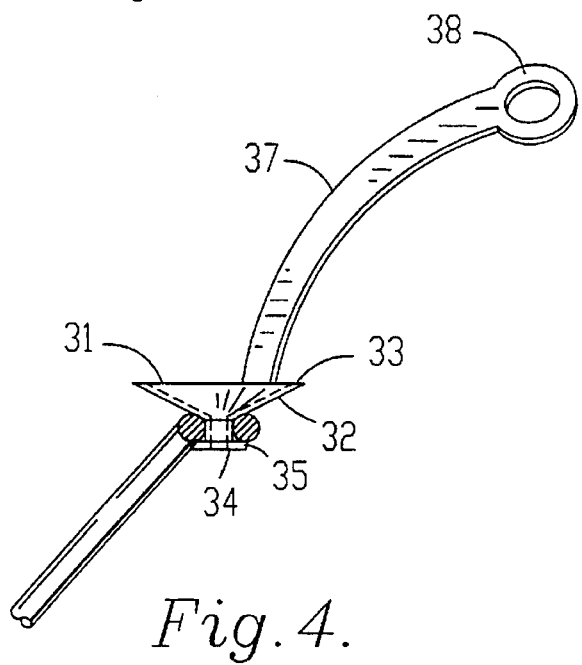
FIG. 4 is a fragmentary sectional view of a molded plastic attaching device inserted through the eye of a fish hook.
Figure 5:
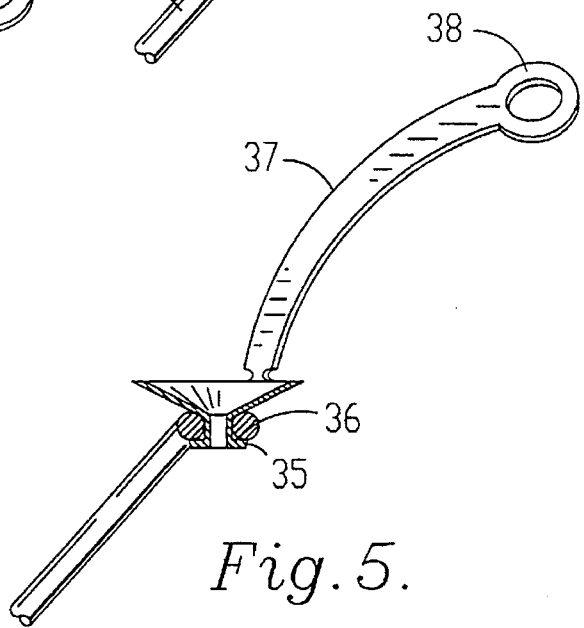
FIG. 5 is a sectional view of the attaching device of FIG. 4.

FIGS. 4 and 5 illustrate another embodiment of attaching device 31 which is advantageously injection molded from plastic. The device 31 includes a tubular central portion 32 and a funnel portion 33 similar to the corresponding parts of the device 21.

A retaining portion 34 is designed to snap through the eye and retain the device on the hook. The retaining portion is formed by an annular flange which extends outwardly from the tubular central portion and which has an outside diameter greater than the inside diameter of the eye. A frusto-conical flared surface 35 on the flange allows the flange to be cammed or wedged through the eye, and a generally radially extending stop surface 36 is engageable with the eye to retain the attaching device on the hook. If desired, one or more slots can be formed in the flange 34 to facilitate inserting the flange through the eye.

A handling tab 37 is molded integarlly to the funnel 33 and terminates in an eye 38. The tab can be snipped off after the attaching device is installed.

After the attaching device is installed on a hook, a line 41 (FIG. 6) is fed into the funnel and pushed through the opening in the funnel and the tubular central portion. The diameter of the opening in the tubular portion is just slightly greater than the diameter of the line. However, the diameter of the outside end or mouth of the funnel is substantially greater than the diameter of the eye 20, and the line can be easily inserted through the opening simply by feeding the end of the line into the wide mouth of the funnel. The outside diameter of the mouth is preferably at least two times the outside diameter of the tubular portion and the inside diameter of the eye 20 and more preferably about three times.

After the end of the line is inserted through the attaching device, the line is doubled back to form an end portion 42

(FIG. 7) of double thickness in order to form a larger knot. The end portion is tied in a simple loop knot 43 (FIG. 8), the knot is tightened, and the ends 44 and 45 (FIG. 9) are snipped off. The line is then pulled to draw the knot against the retaining portion of the attaching device. The diameter of the knot is substantially greater than the diameter of the opening in the attaching device, and the line thereby secured to the hook.

The attaching tab 29 or 37 can be cut off either before or after the line is attached. The attaching tab reduces the likelihood that the attaching device will be dropped or lost during installation, and the tab can also be used to hold the attaching device and the hook while the line is being attached.

FIG. 11 illustrates a plurality of attaching devices 31 hanging from a spring wire or clip 47. The clip includes a coil 48 and a pair of legs 49 and 50. The clip is closed by inserting the leg 49 into the U-shaped end 51 of the leg 50. Each attaching device can be removed as needed by opening the clip and sliding the tab 37 off of the leg 49. The attaching device 21 with the string or wire tab 29 can be stored in a similar manner. Other means for storing the attaching devices can also be used.

While in the foregoing specification, a detailed description of a specific embodiment of the invention was set forth for the purpose of illustration, it will be understood that many of the details herein given may be varied considerably by those skilled in the art without departing from the spirit and scope of the invention.

I claim:

1. An attaching device for use in attaching a line presenting an end to a fishing tackle item having an eye presenting an inside diameter, said device comprising:
    a tubular portion presenting a line-receiving inlet, a line-discharge outlet and a passage therebetween and configured for reception and retention within the eye of a fishing tackle item; and
    guide means coupled with said tubular portion for guiding the end of a line into said inlet and thereby through said passage and outlet, said guide means including
        a funnel portion having walls defining a frusto-conically shaped interior surface, said surface, at the frustrum thereof, surrounding and presenting the same diameter as said inlet, said walls further defining a line-receiving mouth spaced from said inlet and presenting a diameter at least twice that of the inside diameter of the eye,
        said interior surface presenting paths of uniform slope from said mouth to said inlet wherein said paths pass through said inlet and into said passage for guiding the end of a line received through said mouth through said inlet and into said passage.

2. The device as set forth in claim 1, further including restraining means for restraining withdrawal of said tubular portion from the eye.

3. The device as set forth in claim 2, said restraining means including an annular flange surrounding said tubular portion adjacent said outlet.

4. The device as set forth in claim 3, said flange being composed of deformable metal.

5. The device as set forth in claim 3, said flange including a cam surface configured for facilitating insertion through the eye and a stop surface for engaging the eye in order to restrain withdrawal.

6. The device as set forth in claim 2, said restraining means including a plurality of deformable tines extending outwardly from said tubular portion adjacent said outlet.

7. The device as set forth in claim 1, said tubular portion and guide means being integrally formed.

8. The device as set forth in claim 1, said tubular portion being formed of resilient material.

9. The device as set forth in claim 1, said mouth presenting a diameter three times that of the inside diameter of the eye.

10. The device as set forth in claim 1, further including a tab extending outwardly from said funnel portion and configured for holding said attaching device while a line is being inserted therethrough.

11. The device as set forth in claim 10, said tab presenting an opening therethrough for coupling with a storage device.

12. The device as set forth in claim 10, said tab being detachable from said device.

13. A method of attaching a line presenting an end to a fishing tackle item having an eye presenting an inside diameter, said method comprising the steps of:
    (a) coupling an attaching device with the eye of a fishing tackle item, said attaching device including
        a tubular portion presenting a line-receiving inlet, a line-discharge outlet and a passage therebetween and configured for reception and retention within the eye of a fishing tackle item, and
        guide means coupled with said tubular portion for guiding the end of a line into said inlet and thereby through said passage outlet, said guide means including
        a funnel portion having walls defining a frusto-conically shaped interior surface, said surface, at the frustrum thereof, surrounding and presenting the same diameter as said inlet, said walls further defining a line-receiving mouth spaced from said inlet and presenting a diameter at least twice that of the inside diameter of the eye,
        said interior surface presenting paths of uniform slope from said mouth to said inlet wherein said paths pass through said inlet and into said passage for guiding the end of a line received through said mouth through said inlet and into said passage,
        said coupling step including the step of inserting said tubular portion through the eye;
    (b) inserting the end of the line into said funnel portion by way of said mouth whereby said interior surface guides the line and along one of said paths into said inlet and passageway and continuing until the line end emerges from said outlet; and
    (c) grasping the line as it emerges from said outlet and tieing the line in a manner to couple the line with the fishing tackle item.

14. The method as set forth in claim 13, step (c) including the step of tieing the line adjacent the end into a knot having a diameter greater than that of said outlet in order to prevent passage through said outlet.

15. In combination:
    a fishing tackle item having an eye presenting an inside diameter; and
    an attaching device including
        a tubular portion received and retained within said eye and presenting a line-receiving inlet, a line-discharge outlet and a passage therebetween, and guide means coupled with said tubular portion for guiding the end of a line into said inlet and thereby through said passage outlet, said guide means including a funnel portion having walls defining a frustoconically shaped interior surface, said surface, at the frustrum thereof, surrounding and presenting the same diameter as said inlet, said walls further defining a line-receiving mouth spaced from said inlet and presenting a diameter at least twice that of said inside diameter of said eye, said interior surface presenting paths of uniform slope from said mouth to said inlet wherein said paths pass through said inlet and into said passage for guiding the end of a line received through said mouth through said inlet and into said passage.

\* \* \* \* \*